United States Patent
Hall et al.

(10) Patent No.: US 6,830,467 B2
(45) Date of Patent: Dec. 14, 2004

(54) ELECTRICAL TRANSMISSION LINE DIAMETRICAL RETAINER

(75) Inventors: David R. Hall, Provo, UT (US); H. Tracy Hall, Jr., Provo, UT (US); David Pixton, Lehi, UT (US); Scott Dahlgren, Provo, UT (US); Cameron Sneddon, Provo, UT (US); Michael Briscoe, Lehi, UT (US); Joe Fox, Spanish Fork, UT (US)

(73) Assignee: IntelliServ, Inc., Provo, UT (US)

( * ) Notice: Subject to any disclaimer, the term of this patent is extended or adjusted under 35 U.S.C. 154(b) by 0 days.

(21) Appl. No.: 10/427,522

(22) Filed: Apr. 30, 2003

(65) Prior Publication Data

US 2004/0219831 A1 Nov. 4, 2004

Related U.S. Application Data

(63) Continuation-in-part of application No. 10/358,099, filed on Feb. 2, 2003.
(60) Provisional application No. 60/444,100, filed on Jan. 31, 2003.

(51) Int. Cl.$^7$ .................................................. H01R 4/60
(52) U.S. Cl. ....................................... 439/194; 166/65.1
(58) Field of Search ................................. 439/191, 194, 439/195, 578; 166/65.1; 340/854.9, 855.1, 855.2

(56) References Cited

U.S. PATENT DOCUMENTS

| | | |
|---|---|---|
| 749,633 A | 1/1904 | Seeley |
| 2,178,931 A | 11/1939 | Crites et al. |
| 2,197,392 A | 4/1940 | Hawthorn |
| 2,249,769 A | 7/1941 | Leonardon |
| 2,301,783 A | 11/1942 | Lee |
| 2,354,887 A | 8/1944 | Silverman et al. |
| 2,379,800 A | 7/1945 | Hare |
| 2,414,719 A | 1/1947 | Cloud |
| 2,531,120 A | 11/1950 | Feaster |
| 2,633,414 A | 3/1953 | Boivinet |
| 2,659,773 A | 11/1953 | Barney |
| 2,662,123 A | 12/1953 | Koenig, Jr. |
| 2,748,358 A | 5/1956 | Jobnston |
| 2,974,303 A | 3/1961 | Dixon |
| 2,982,360 A | 5/1961 | Morton et al. |
| 3,079,549 A | 2/1963 | Martin |
| 3,090,031 A | 5/1963 | Lord |
| 3,170,137 A | 2/1965 | Brandt |
| 3,186,222 A | 6/1965 | Martin |
| 3,194,886 A | 7/1965 | Mason |
| 3,209,323 A | 9/1965 | Grossman, Jr. |
| 3,227,973 A | 1/1966 | Gray |
| 3,253,245 A | 5/1966 | Brandt |

(List continued on next page.)

FOREIGN PATENT DOCUMENTS

| | | |
|---|---|---|
| EP | 0399987 A1 | 11/1990 |
| WO | WO8801096 | 2/1988 |
| WO | WO9014497 | 11/1990 |

OTHER PUBLICATIONS

Office Action by USPTO mailed Mar. 23, 2004 for related application 10/358,099.

*Primary Examiner*—Ross Gushi
(74) *Attorney, Agent, or Firm*—Jeffery E. Daly; Cameron R. Sneddon

(57) ABSTRACT

The invention is a mechanism for retaining an electrical transmission line. In one embodiment of the invention it is a system for retaining an electrical transmission line within down hole components. In accordance with one aspect of the invention, the system includes a plurality of downhole components, such as sections of pipe in a drill string. The system also includes a coaxial cable running between the first and second end of a drill pipe, the coaxial cable having a conductive tube and a conductive core within it. The invention allows the electrical transmission line to withstand the tension and compression of drill pipe during routine drilling cycles.

23 Claims, 8 Drawing Sheets

U.S. PATENT DOCUMENTS

| | | | |
|---|---|---|---|
| 3,518,608 A | | 6/1970 | Papadopoulos |
| 3,696,332 A | | 10/1972 | Dickson, Jr. et al. |
| 3,793,632 A | | 2/1974 | Still |
| 3,807,502 A | | 4/1974 | Heilhecker et al. |
| 3,829,816 A | * | 8/1974 | Barry et al. ............... 439/191 |
| 3,879,097 A | * | 4/1975 | Oertle ................... 340/855.1 |
| 3,930,220 A | | 12/1975 | Shawhan |
| 3,936,118 A | * | 2/1976 | Thiery et al. ............... 439/191 |
| 3,957,118 A | | 5/1976 | Barry et al. |
| 3,989,330 A | * | 11/1976 | Cullen et al. ............... 439/194 |
| 4,012,092 A | | 3/1977 | Godbey |
| 4,051,456 A | * | 9/1977 | Heilhecker et al. ...... 340/855.2 |
| 4,087,781 A | | 5/1978 | Grossi et al. |
| 4,095,865 A | * | 6/1978 | Denison et al. ............ 439/191 |
| 4,121,193 A | * | 10/1978 | Denison ................ 340/855.1 |
| 4,126,848 A | | 11/1978 | Denison |
| 4,215,426 A | | 7/1980 | Klatt |
| 4,220,381 A | | 9/1980 | Van der Graaf |
| 4,348,672 A | | 9/1982 | Givler |
| 4,445,734 A | * | 5/1984 | Cunningham ............... 439/194 |
| 4,496,203 A | * | 1/1985 | Meadows .................. 439/194 |
| 4,537,457 A | | 8/1985 | Davis, Jr. et al. |
| 4,578,675 A | | 3/1986 | MacLeod |
| 4,605,268 A | | 8/1986 | Meador |
| 4,660,910 A | | 4/1987 | Sharp et al. |
| 4,683,944 A | | 8/1987 | Curlett |
| 4,690,212 A | * | 9/1987 | Termohlen ................. 166/65.1 |
| 4,698,631 A | | 10/1987 | Kelly, Jr. et al. |
| 4,722,402 A | | 2/1988 | Weldon |
| 4,785,247 A | * | 11/1988 | Meador et al. ............. 324/338 |
| 4,788,544 A | | 11/1988 | Howard |
| 4,806,928 A | | 2/1989 | Veneruso |
| 4,884,071 A | | 11/1989 | Howard |
| 4,901,069 A | | 2/1990 | Veneruso |
| 4,914,433 A | | 4/1990 | Galle |
| 4,924,949 A | | 5/1990 | Curlett |
| 5,008,664 A | | 4/1991 | More et al. |
| 5,052,941 A | | 10/1991 | Hernandez-Marti et al. |
| 5,148,408 A | | 9/1992 | Matthews |
| 5,221,214 A | * | 6/1993 | Martin ..................... 439/191 |
| 5,248,857 A | | 9/1993 | Ollivier |
| 5,278,550 A | | 1/1994 | Rhein-Knudsen et al. |
| 5,302,138 A | | 4/1994 | Shields |
| 5,311,661 A | | 5/1994 | Zifferer |
| 5,332,049 A | | 7/1994 | Tew |
| 5,334,801 A | * | 8/1994 | Mohn ......................... 174/47 |
| 5,371,496 A | | 12/1994 | Tanamachi |
| 5,396,965 A | * | 3/1995 | Hall et al. ................... 173/73 |
| 5,454,605 A | | 10/1995 | Mott |
| 5,455,573 A | | 10/1995 | Delatorre |
| 5,505,502 A | | 4/1996 | Smith et al. |
| 5,517,843 A | | 5/1996 | Winship |
| 5,521,592 A | | 5/1996 | Veneruso |
| 5,568,448 A | | 10/1996 | Tanigushi et al. |
| 5,650,983 A | | 7/1997 | Kondo et al. |
| 5,691,712 A | | 11/1997 | Meek et al. |
| 5,743,301 A | | 4/1998 | Winship |
| RE35,790 E | | 5/1998 | Pustanyk et al. |
| 5,810,401 A | | 9/1998 | Mosing et al. |
| 5,833,490 A | * | 11/1998 | Bouldin .................... 439/462 |
| 5,853,199 A | | 12/1998 | Wilson |
| 5,856,710 A | | 1/1999 | Baughman et al. |
| 5,898,408 A | | 4/1999 | Du |
| 5,908,212 A | | 6/1999 | Smith et al. |
| 5,924,499 A | | 7/1999 | Birchak et al. |
| 5,942,990 A | | 8/1999 | Smith et al. |
| 5,955,966 A | | 9/1999 | Jeffryes et al. |
| 5,959,547 A | | 9/1999 | Tubel et al. |
| 5,971,072 A | | 10/1999 | Huber et al. |
| 6,030,004 A | | 2/2000 | Schock et al. |
| 6,041,872 A | | 3/2000 | Holcomb |
| 6,045,165 A | | 4/2000 | Sugino et al. |
| 6,046,685 A | | 4/2000 | Tubel |
| 6,057,784 A | | 5/2000 | Schaaf et al. |
| 6,104,707 A | | 8/2000 | Abraham |
| 6,108,268 A | | 8/2000 | Moss |
| 6,123,561 A | * | 9/2000 | Turner et al. ............... 439/194 |
| 6,141,763 A | | 10/2000 | Smith et al. |
| 6,157,761 A | * | 12/2000 | Wittrisch ................... 385/107 |
| 6,173,334 B1 | | 1/2001 | Matsuzaki et al. |
| 6,177,882 B1 | | 1/2001 | Ringgenberg et al. |
| 6,188,223 B1 | | 2/2001 | Van Steenwyk et al. |
| 6,196,325 B1 | * | 3/2001 | Connell et al. ............. 166/377 |
| 6,196,335 B1 | | 3/2001 | Rodney |
| 6,209,632 B1 | | 4/2001 | Holbert et al. |
| 6,220,362 B1 | * | 4/2001 | Roth et al. .................. 166/380 |
| 6,223,826 B1 | * | 5/2001 | Chau et al. ................. 166/380 |
| 6,367,565 B1 | | 4/2002 | Hall |
| 6,392,317 B1 | * | 5/2002 | Hall et al. .................... 307/90 |
| 6,394,837 B1 | * | 5/2002 | Edwards et al. ............ 439/426 |
| 6,398,583 B1 | * | 6/2002 | Zehren ...................... 439/576 |
| 6,405,795 B2 | | 6/2002 | Holbert et al. |
| 6,446,728 B2 | * | 9/2002 | Chau et al. ................. 166/380 |
| 6,484,801 B2 | * | 11/2002 | Brewer et al. ............. 166/65.1 |
| 6,641,434 B2 | | 11/2003 | Boyle et al. |
| 6,655,464 B2 | | 12/2003 | Chau et al. |
| 6,670,880 B1 | * | 12/2003 | Hall et al. .................. 336/132 |
| 6,688,396 B2 | * | 2/2004 | Floerke et al. ............. 166/380 |
| 6,717,501 B2 | * | 4/2004 | Hall et al. .................. 336/132 |
| 2002/0135179 A1 | * | 9/2002 | Boyle et al. ............... 285/21.1 |
| 2002/0193004 A1 | | 12/2002 | Boyle et al. |
| 2003/0070842 A1 | | 4/2003 | Bailey et al. |
| 2003/0213598 A1 | | 11/2003 | Hughes |

* cited by examiner

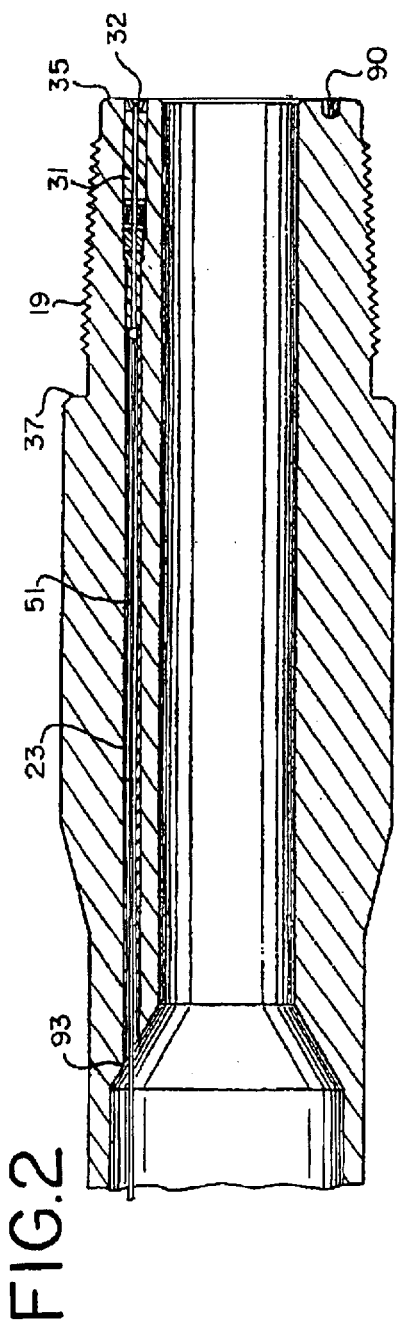
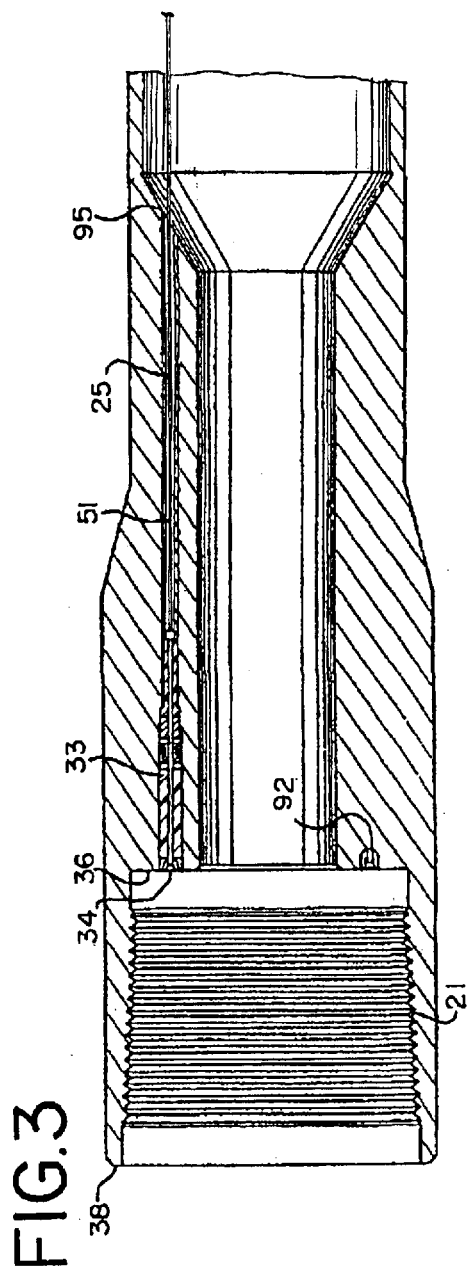

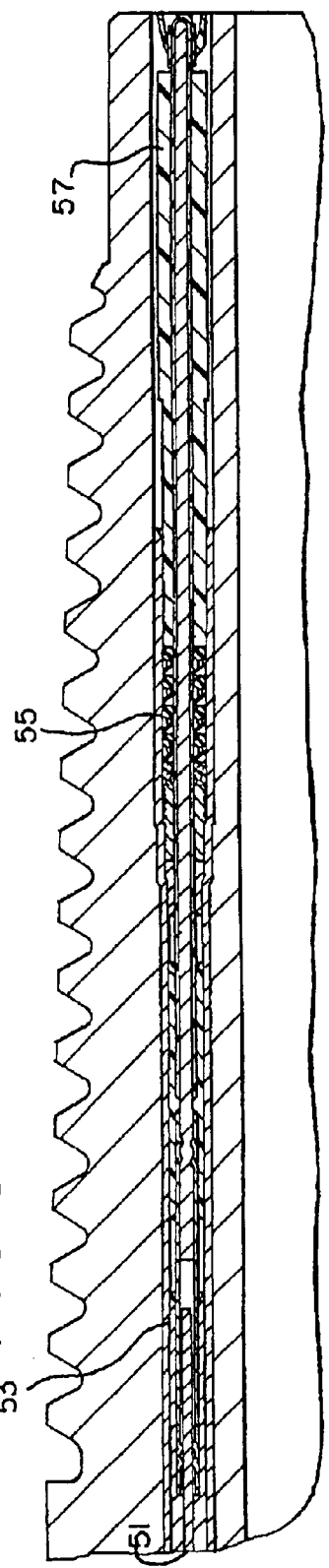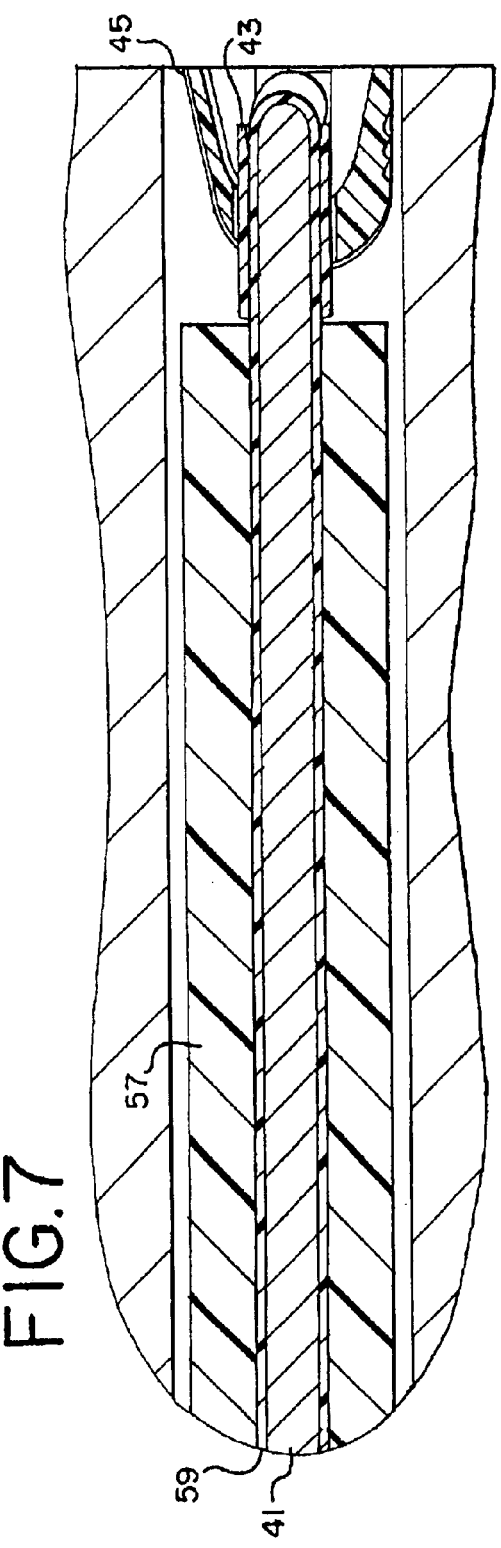

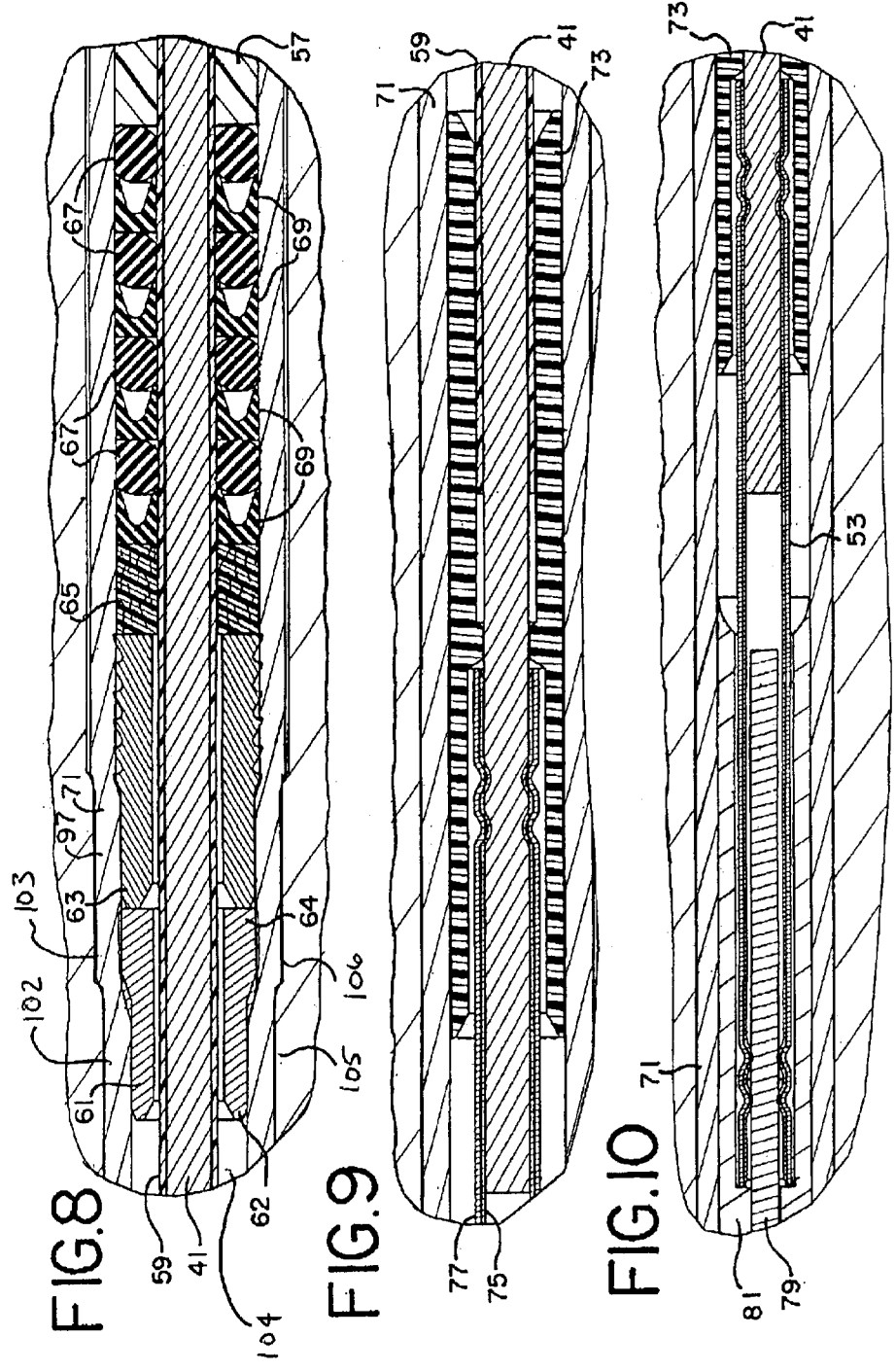

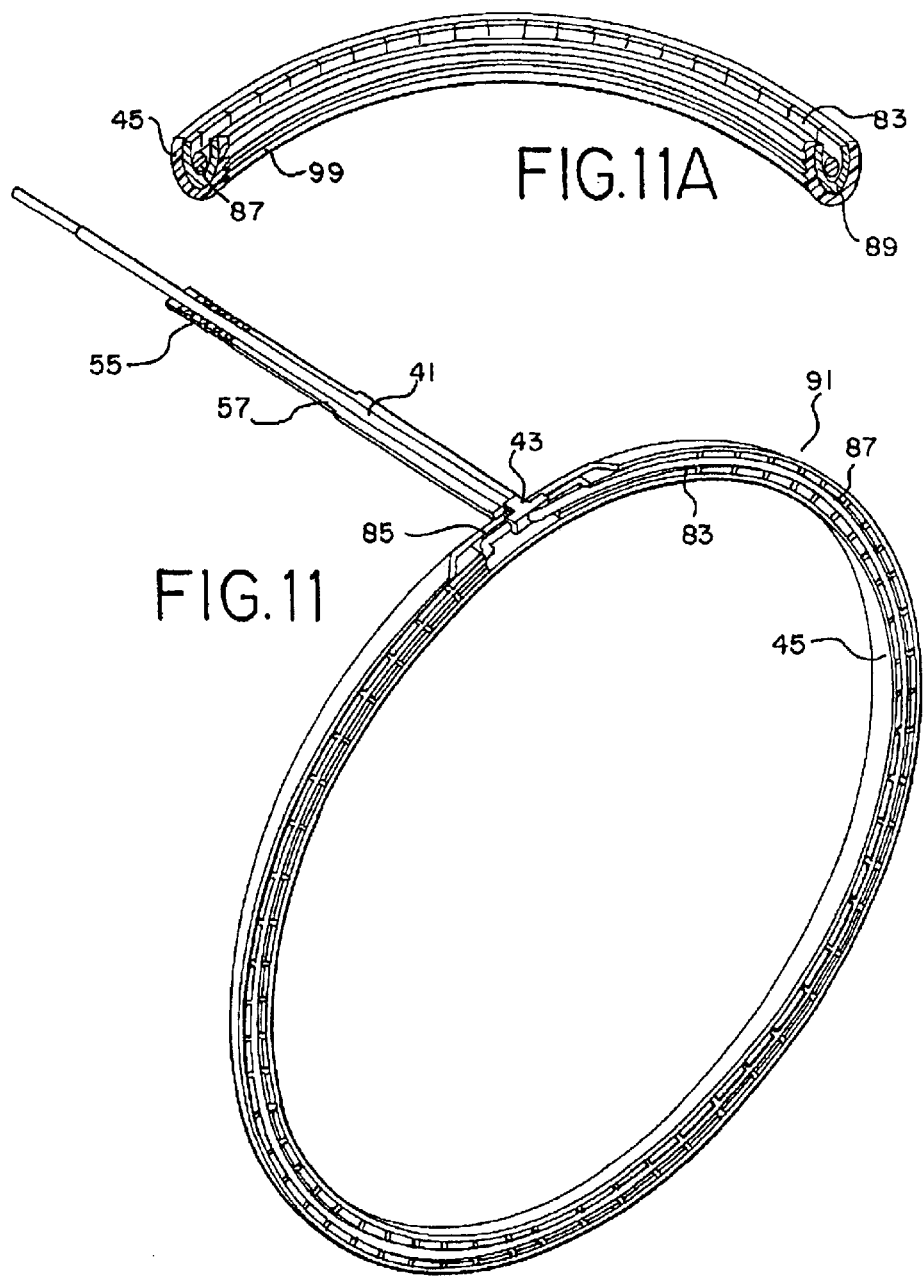

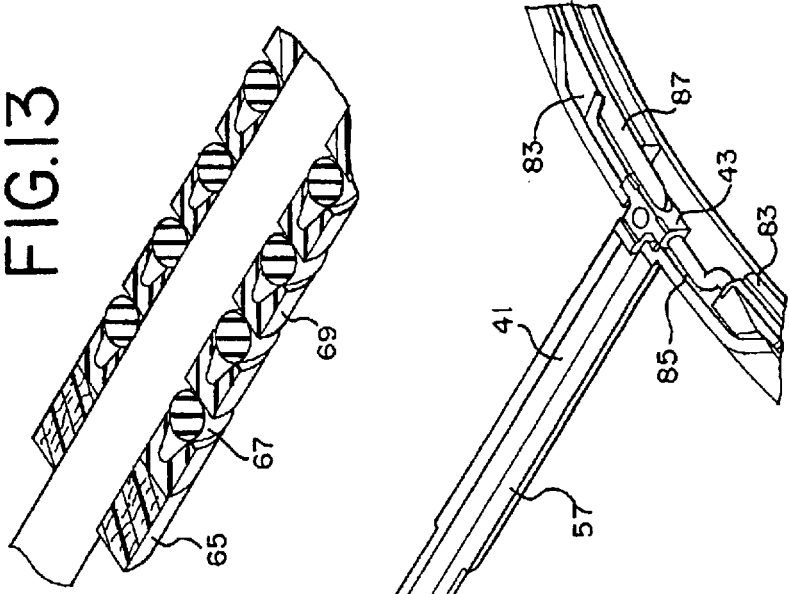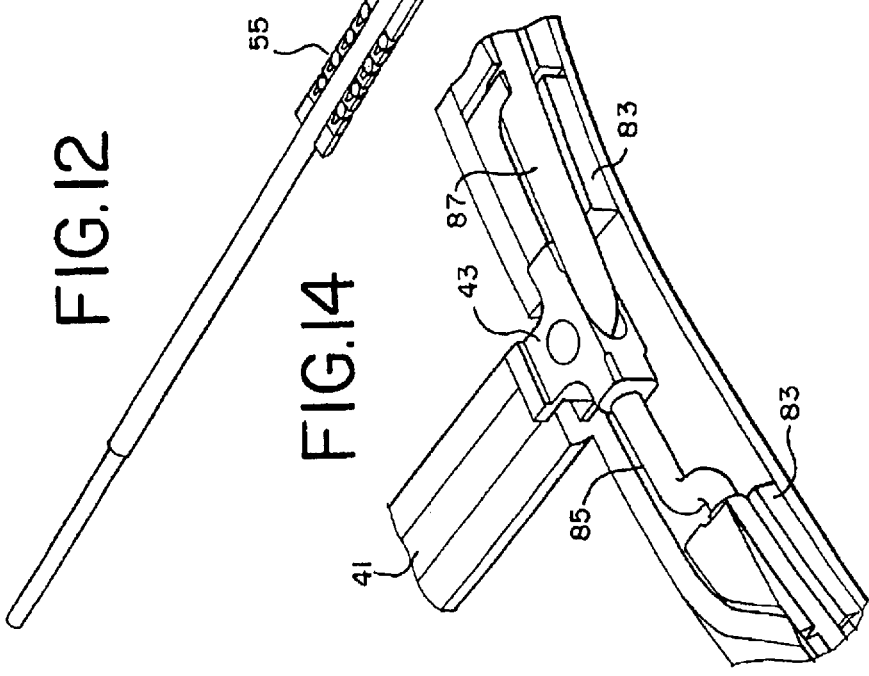

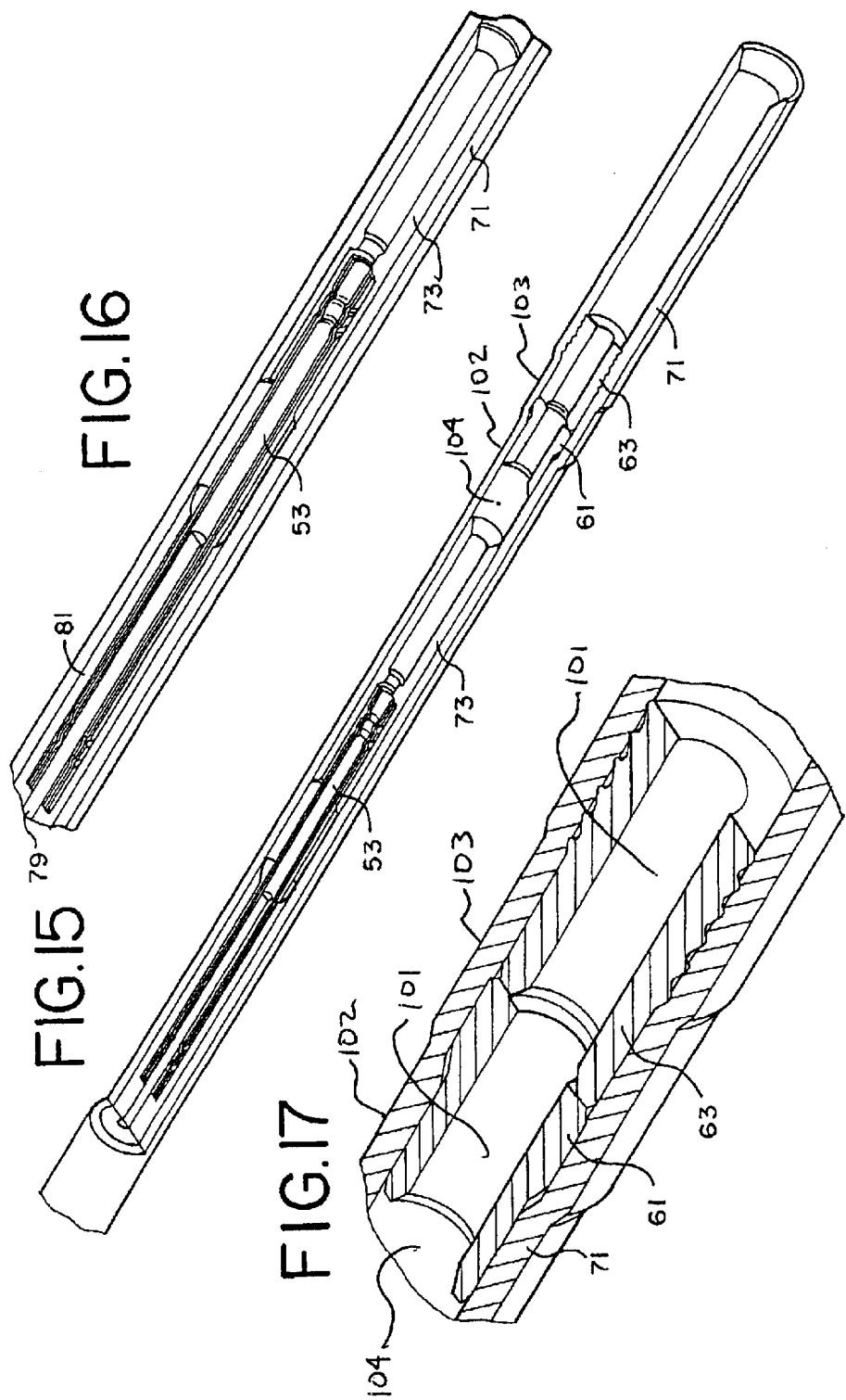

ELECTRICAL TRANSMISSION LINE DIAMETRICAL RETAINER

CROSS REFERENCE TO RELATED APPLICATIONS

This application is a continuation-in-part of U.S. application Ser. No. 10/358,099, filed Feb. 2, 2003, the contents of which are hereby incorporated by reference herein, which is a provisional of U.S. application Ser. No. 60/444,100 filed Jan. 31, 2003.

This invention was made with government support under Contract No. DE-FC26-97FT343656 awarded by the U.S. Department of Energy. The government has certain rights in the invention.

BACKGROUND

The present invention relates to the field of electrical connectors, particularly connectors for coaxial cables. The preferred connectors are particularly well suited for use in harsh environments wherein it is desirable to seal the connection from the elements. One such application is in data transmission systems for downhole environments, such as along a drill string used in oil and gas exploration or along the casings and other equipment used in oil and gas production. The goal of accessing data from a drill string has been expressed for more than half a century. As exploration and drilling technology has improved, this goal has become more important in the industry for successful oil, gas, and geothermal well exploration and production. For example, to take advantage of the several advances in the design of various tools and techniques for oil and gas exploration, it would be beneficial to have real time data such as temperature, pressure, inclination, salinity, etc. Several attempts have been made to devise a successful system for accessing such drill string data. One such system is disclosed in co-pending U.S. application Ser. No. 09/909,469 (also published as PCT Application WO 02/06716) which is assigned to the same assignee as the present invention. The disclosure of this U.S. Application Serial No. 09/909469 is incorporated herein by reference.

SUMMARY

Briefly stated, the invention is a system for retainging an electrical transmission line through a string of downhole components.

In accordance with one aspect of the invention, the system includes a plurality of downhole components, such as sections of pipe in a drill string. Each component has a first and second end, with a first communication element located at the first end and a second communication element located at the second end. Each communication element includes a first contact and a second contact. The system also includes a coaxial cable running between the first and second communication elements, the coaxial cable having a conductive tube and a conductive core within it. The system also includes a first and second connector for connecting the first and second communication elements respectively to the coaxial cable. Each connector includes a conductive sleeve, lying concentrically within the conductive tube, which fits around and makes electrical contact with the conductive core. The conductive sleeve is electrically isolated from the conductive tube. The conductive sleeve of the first connector is in electrical contact with the first contact of the first communication element, the conductive sleeve of the second connector is in electrical contact with the first contact of the second communication element, and the conductive tube is in electrical contact with both the second contact of the first communication element and the second contact of the second communication element.

The first and second communication elements are preferably inductive coils, and the inductive coils are preferably formed by a single loop of wire. More preferably, the inductive coils include at least one loop of wire set in circular trough of a magnetically conducting, electrically insulating material, preferably ferrite. Preferably, the trough is formed of segments of a magnetically conducting electrically insulating material, with the electrically insulating material segments preferably retained within a groove formed in a metal ring.

In accordance with another aspect of the invention, the components are sections of drill pipe, each having a central bore, and the first and second communication elements are located in a first and second recess respectively at each end of the drill pipe. The system further includes a first passage passing between the first recess and the central bore and a second passage passing between the second recess and the central bore. The first and second connectors are located in the first and second passages respectively. Preferably, each section of drill pipe has a portion with an increased wall thickness at both the box end and the pin end with a resultant smaller diameter of the central bore at the box end and pin end, and the first and second passages run through the portions with an increased wall thickness and generally parallel to the longitudinal axis of the drill pipe. The box end and pin end is also sometimes referred to as the box end tool joint and pin end tool joint.

In accordance with another aspect of the invention, the system includes a first and second expansion plug, each of which includes a central passage and each of which is press-fit within the conductive tube so as to maintain the increased outside diameter of the conductive tube within the larger diameter portions of the first and second passages respectively. The system also preferably includes a first and second retaining plug, each of which includes ridges on its outer surface to retain the expansion plugs in place.

The expansion plugs could alternatively be internal diametrical expansion mandrels with a central passage, the expansion mandrel having a front and back end. The back end of the expansion mandrel has an outer diameter that is greater than an outer diameter of the front end of the expansion mandrel. The retention plugs could alternatively be expansion mandrels with the back end having external circumferential grooved barbs, also known as a barbed expansion mandrel, that dig into the conductive tube internal diameter. These expansion mandrels become electrical transmission line retainers when displaced within and electrical transmission line. The central passage of the expansion mandrels or retainers could also be electrically insulated allowing bare wire to pass through without causing an electrical short.

In accordance with another aspect of the invention, the first and second communication elements each includes an inductive coil having at least one loop of wire. In each communication element, there is a water-tight seal between the wire and the inside of the conductive tube. The water-tight seal preferably includes at least one gasket through which the first end of the wire passes and which forms a seal with the inner surface of the conductive tube.

The invention also includes a method of electrically connecting communication elements at opposite ends of a downhole component through a coaxial conductor. The method includes providing a coaxial cable as the conductor between the first and second communication elements. The coaxial cable includes a conductive tube, a conductive core within the conductive tube and a dielectric material between the conductive tube and the conductive tube. The method also includes providing a first and second connector for connecting the first and second respective communication elements to the coaxial cable. The first and second connectors each include a conductive sleeve that fits around and makes electrical contact with the conductive core. The conductive sleeve is electrically isolated from the conductive tube. The method also includes removing a portion of the dielectric material at both ends of the coaxial cable to provide clearance for the conductive sleeve, and sliding the first and second connectors over both ends of the coaxial cable.

In accordance with another aspect of the invention, the method includes expanding the outside diameter of the conductive tube by inserting an expansion plug or mandrel into each end. The first and second communication elements each include an inductive coil having at least one loop of wire. In each communication element, a first end of the wire is in electrical contact with the conductive tube and a second end of the wire is in electrical contact with the conductive sleeve. The method further includes inserting a water-tight seal between the second end of the wire and the inside of the conductive tube.

The present invention, together with attendant objects and advantages, will be best understood with reference to the detailed description below in connection with the attached drawings.

BRIEF DESCRIPTION OF THE DRAWINGS

FIG. 2 is a cross-sectional view along line 2—2 of FIG. 1.

FIG. 3 is a cross sectional view along line 3—3 of FIG. 1.

FIG. 6 is a cross-sectional view of the pin end of a drill pipe showing the connector.

FIG. 7 is an enlarged cross-sectional view from FIG. 6 showing the placement of the magnetically connecting, electrically insulating (MCEI) element in the recess of the pin end of a drill pipe.

FIG. 8 is an enlarged cross-sectional view from FIG. 6 showing the placement of the expansion plug or mandrel, retaining plug or barbed expansion mandrel, and water-tight seal.

FIG. 9 is an enlarged cross-sectional view from FIG. 6 showing the placement of the centering guide.

FIG. 10 is an enlarged cross-sectional view from FIG. 6 showing the connector and the end of the coaxial cable.

FIG. 11 is a perspective view of the communication element and steel ring.

FIG. 11A is a perspective view showing a cross section of the communication element.

FIG. 12 is perspective view of the wire and the wire protection bridge.

FIG. 13 is an enlarged perspective view showing the water-tight seal.

FIG. 14 is an enlarged perspective view of FIG. 12 showing the wire protection bridge.

FIG. 15 is a perspective view of the conductive tube and connection elements.

FIG. 16 is an enlarged perspective view of FIG. 15 showing the centering guide and the connector.

FIG. 17 is an enlarged perspective view of FIG. 15 showing the expansion plug or mandrel and the retaining plug or barbed expansion mandrel.

DETAILED DESCRIPTION OF THE PRESENTLY PREFERRED EMBODIMENTS

It should be noted that, as used herein, the term "downhole" is intended to have a relatively broad meaning, including such environments as drilling in oil and gas, gas and geothermal exploration, the systems of casings and other equipment used in oil, gas and geothermal production.

It should also be noted that the term "transmission" as used in connection with the phrase data transmission or the like, is intended to have a relatively broad meaning, referring to the passage of signals in at least one direction from one point to another.

It should further be noted that the term "magnetically conductive" refers to a material having a magnetic permeability greater than that of air.

It should further be noted that the term "electrically insulating" means having a high electrical resistivity, preferably greater than that of steel.

Figure 1:
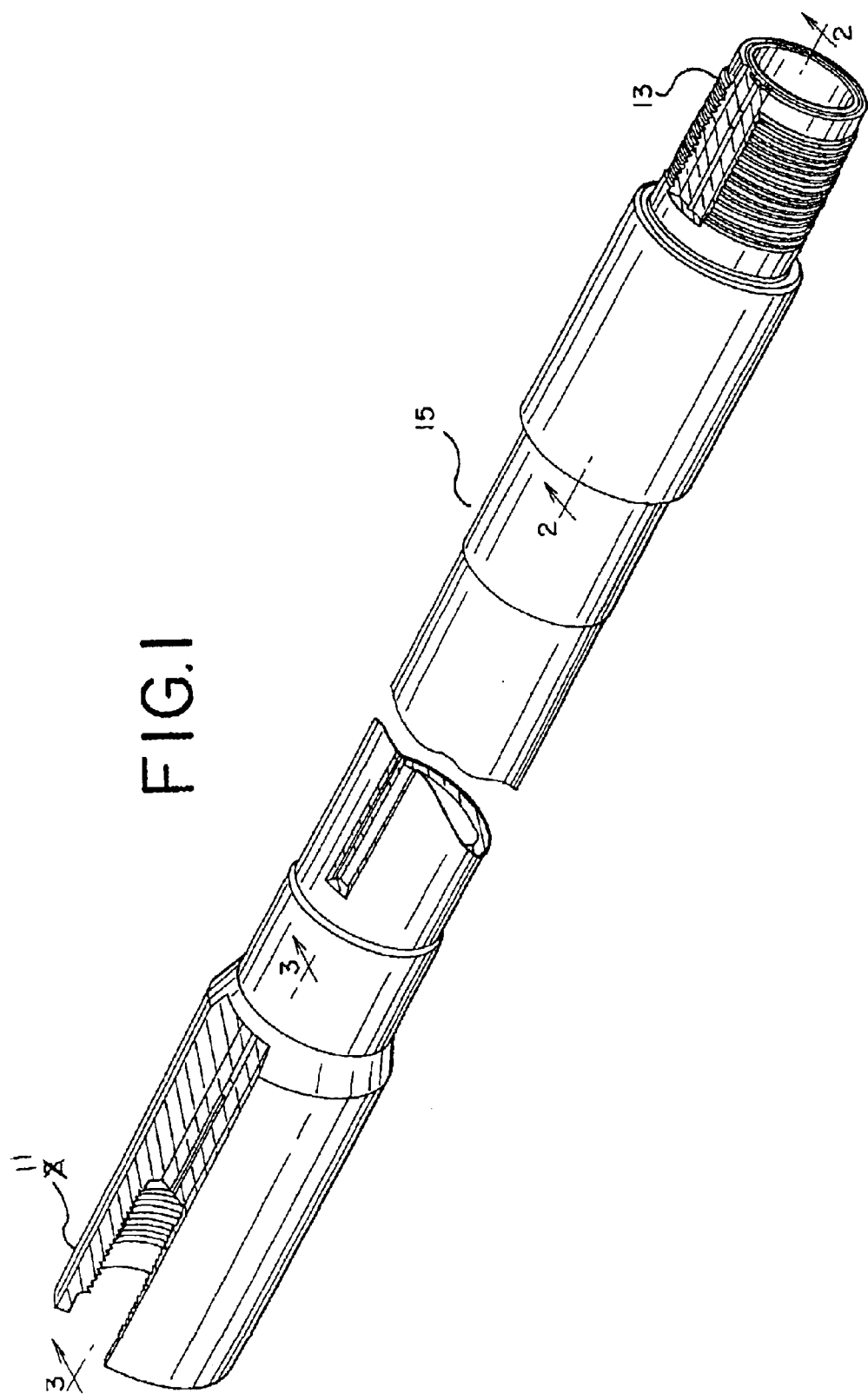
FIG. 1 is a perspective view of a section of drill pipe with cutaway sections showing the data transmission system.

Referring to the drawings, FIG. 1 is a perspective view of a section of drill pipe with cutaway sections showing the data transmission system of the present invention. The most preferred application of the connector is in the data transmission system in sections of drill pipe, which make up a drill string used in oil and gas or geothermal exploration.

The depicted section 15 of FIG. 1 includes a pin end 13, having external tapered threads 19 (see FIG. 2), and a box end 11, having internal tapered threads 21 (see FIG. 3). Between the pin end 13 and box end 11 is the body of the section. A typical length of the body is between 30 and 90 feet. Drill strings in oil and gas production can extend as long as 20,000 feet, which means that as many as 700 sections of drill pipe and downhole tools can be used in the drill string.

Figure 4:
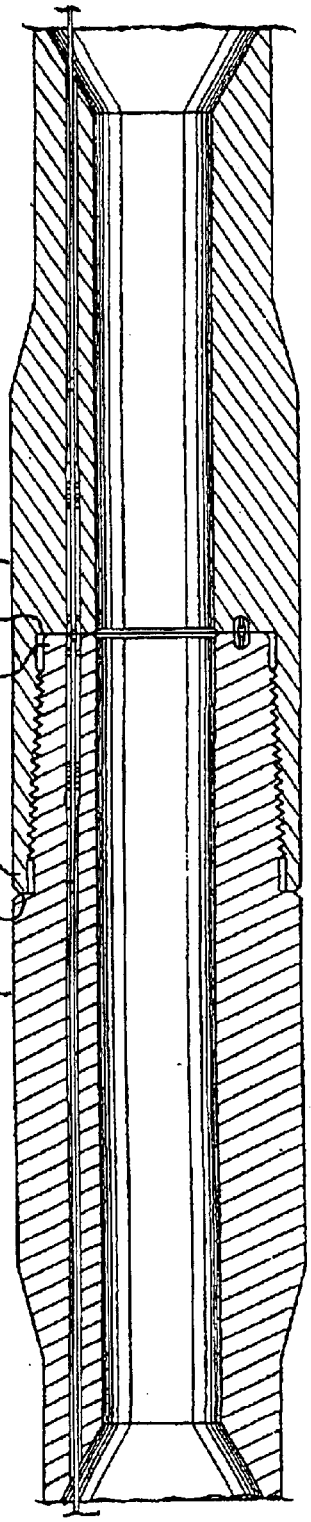
FIG. 4 is a cross-sectional view showing the pin end of FIG. 2 connected to the box end of FIG. 3.
Figure 5C:
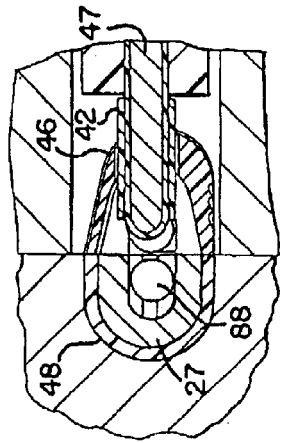
FIG. 5C is an enlarged cross-section of a connection between communication elements of a connected pin and box end, showing the protective bridge on the box end.
Figure 5B:
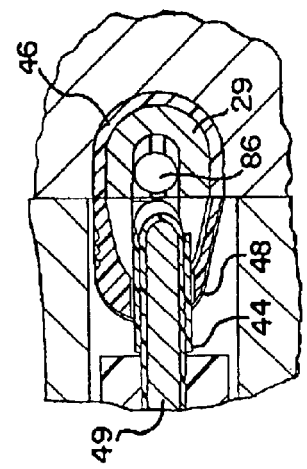
FIG. 5B is an enlarged cross-section of a connection between communication elements of a connected pin and box end, showing the protective bridge on the pin end.
Figure 5A:
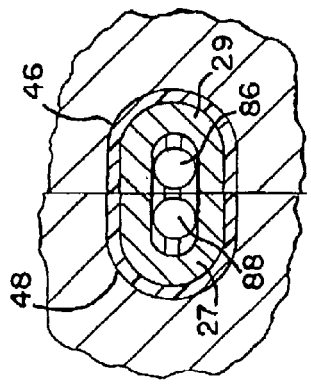
FIG. 5A is an enlarged cross-section of a connection between communication elements of a connected pin and box end.

There are several designs for the pin and box end of drill pipe. At present, the most preferred design to use with the present invention is that which is described in U.S. Pat. No. 5,908,212 to Grant Prideco, Inc. of Woodlands, Tex., the entire disclosure of which is incorporated herein by reference. As shown in FIG. 2, the pin end 13 includes an external, primary shoulder 37, and an internal, secondary shoulder or face 35. As shown in FIG. 3, the box end 11 includes an external, primary shoulder 38 and an internal, secondary shoulder or face 36. As shown in FIG. 4, when two sections of drill pipe are connected, the pin end 13 is threaded into the box end 11 with sufficient force so that the primary external shoulder 37 on the pin end engages the primary shoulder face 38 on the box end. As a result of this connection being indexed by the primary shoulder 37 and the primary shoulder face 38, the face 35 on the pin end is reliably brought into close proximity or contact with the shoulder 36 on the box end. The advantages this provides to the present invention will be discussed below.

As shown in FIG. 2, the pin end 13 preferably includes a recess 32 in the secondary or internal shoulder or face 35. Preferably, the recess is located so as to lie equidistant between the inner and outer diameter of the secondary shoulder or face 35. Alternatively, the recess is formed at either the inner or the outer diameter of the face, thereby creating a recess that is open on two sides.

Preferably, the recess is machined into the face by conventional tools either before or after the tool joint is attached to the pipe. The dimensions of the recess can be varied depending on various factors. For one thing, it is desirable to form the recess in a location and with a size that will not interfere with the mechanical strength of the pin end. Further, in this orientation, the recesses are located so as to be substantially aligned as the joint is made up. Other factors will be discussed below.

As can be seen in these figures, the recess is preferably configured so as to open axially, that is, in a direction parallel to the length of the drill string. However, in alternative embodiments, the recesses may be configured so as to open radially, that is, in a direction perpendicular to the length of the drill string. This offset configuration does not materially affect the performance of the inductive elements of the present invention whether in an axial or radial configuration.

Referring to FIGS. 1, 2, and 3, lying within the recesses 32 and 34 formed in the Internal pin face 35 and internal shoulder face 36 respectively is a communication element. As will be discussed below, the preferred communication element is an inductive coil. However, other communication elements, such as acoustic transceivers, optic fiber couplers and electrical contacts are also benefited by being placed in a recess formed in the internal pin face and internal shoulder face. In particular, placing the communication elements in recesses within internal faces provides for better protection from the harsh drilling environment. Also, when using a pipe joint such as that shown in FIG. 4 that also includes external abutting faces 37 and 38, the internal faces 35 and 36 are brought together in a more reliable manner. That is, with the primary load taken by the external faces 37 and 38, the internal faces 35 and 36 are brought together with a more consistent force. Preferably, the internal faces are less than about 0.03" apart when the adjacent components are fully threaded together. More preferably, the internal faces are touching. Most preferably, the internal faces are in a state of compression.

Returning to a discussion of the preferred embodiment with inductive coils as the communication elements, it is noted that a typical drill pipe alloy, 4140 alloy steel, having a Rockwell C hardness of 30 to 35, has a magnetic permeability of about 42. The magnetic permeability of a material is defined as the ratio of the magnetic flux density B established within a material divided by the magnetic field strength H of the magnetizing field. It is usually expressed as a dimensionless quantity relative to that of air (or a vacuum). It is preferable to close the magnetic path that couples the adjacent coils with a material having a magnetic permeability higher than the steel. However, if the magnetic material is itself electrically conducting, then it provides an alternate electrical path to that offered by the adjacent loops. The currents thus generated are referred to as eddy currents; these are believed to be the primary source of the losses experienced in prior-art transformer schemes. Since the magnetic field is in a direction curling around the conductors, there is no need for magnetic continuity in the direction of the loop.

In the preferred embodiment illustrated in FIGS. 2, 3 and 11, there is located within the recess 32 a communication element 90 and within the recess 34 an identical communication element 92. In the preferred embodiment, the communication element consists of a steel ring 45 containing a magnetically conducting, electrically insulating (MCEI) element 89, and a conductive coil 87 lying within the MCEI.

One property of the MCEI element is that it is magnetically conducting. One measure of this property is referred to as the magnetic permeability discussed above. In general, the magnetically conducting component should have a magnetic permeability greater than air. Materials having too high of a magnetic permeability tend to have hysteresis losses associated with reversal of the magnetic domains themselves. Accordingly, a material is desired having a permeability sufficiently high to keep the field out of the steel and yet sufficiently low to minimize losses due to magnetic hysteresis. Preferably, the magnetic permeability of the MCEI element should be greater than that of steel, which is typically about 40 times that of air, more preferably greater than about 100 times that of air. Preferably, the magnetic permeability is less than about 2,000. More preferably, the MCEI element has a magnetic permeability less than about 800. Most preferably, the MCEI element has a magnetic permeability of about 125.

In order to avoid or reduce the eddy currents discussed above, the MCEI is preferably electrically insulating as well as magnetically conducting. Preferably, the MCEI element has an electrical resistivity greater than that of steel, which is typically about 12 micro-ohm cm. Most preferably, the MCEI has an electrical resistivity greater than about one million ohm-cm.

The MCEI element 89 is preferably made from a single material, which itself has the properties of being magnetically conducting and electrically insulating. A particularly preferred material is ferrite. Ferrite is described in the on-line edition of the Encyclopedia Britannica as "a ceramic-like material with magnetic properties that are useful in many types of electronic devices. Ferrites are hard, brittle, iron-containing, and generally gray or black and are polycrystalline—i.e., made up of a large number of small crystals. They are composed of iron oxide and one or more other metals in chemical combination." The article on ferrite goes on to say that a "ferrite is formed by the reaction of ferric oxide (iron oxide or rust) with any of a number of other metals, including magnesium, aluminum, barium, manganese, copper, nickel, cobalt, or even iron itself." Finally, the article states that the "most important properties of ferrites include high magnetic permeability and high electrical resistance." Consequently, some form of ferrite is ideal for the MCEI element in the present invention. Most preferably, the ferrite is one commercially available from Fair-Rite Products Corp., Wallikill, N.Y., grade 61, having a magnetic permeability of about 125. Another preferred commercial supplier of ferrite is Gascyl Ent., Coquitlan, B. C., Canada. There are a number of other manufacturers that provide commercial products having a corresponding grade and permeability albeit under different designations.

As an alternative to using a single material that is both magnetically conductive and electrically Insulating, the MCEI element can be made from a combination of materials selected and configured to give these properties to the element as a whole. For example, the element can be made from a matrix of particles of one material that is magnetically conductive and particles of another material that is electrically insulating, wherein the matrix is designed so as to prevent the conduction of electrical currents, while promoting the conduction of a magnetic current. One such material, composed of ferromagnetic metal particles molded in a polymer matrix, is known in the art as "powdered iron." Also, instead of a matrix, the MCEI element may be formed from laminations of a material such as a silicon transformer steel separated by an electrically insulating material, such as a ceramic, mineral (mica), or a polymer. Because the induced electric field is always perpendicular to the magnetic field, the chief requirement for the MCEI element is that the magnetic field be accommodated in a direction that wraps around the coil, whereas electrical conduction should be blocked in the circumferential direction, perpendicular to the magnetic field and parallel to the coil.

In a more preferred embodiment shown in FIGS. 11 and 11A, the communication element 91 contains an MCEI element. The MCEI element is formed from several segments of ferrite 83 which are held together in the appropriate configuration by means of a resilient material, such as an epoxy, a natural rubber, polytetrafluoroethylene (PTFE), perfluoroalkoxy (PFA), a fiberglass or carbon fiber composite, or a polyurethane. A preferred method of forming a segmented MCEI element begins with providing a steel ring 45 having a generally unshaped trough conforming to the final dimensions of the MCEI element. In a preferred embodiment, the steel ring 45 has ridges 99 around its circumference in order to enhance the connection of the steel ring to the drill pipe.

The element 99 is preferably manufactured as a complete unit and is then inserted into the drill pipe, the final assembly configuration being shown in FIGS. 8, 9, and 10. To manufacture the element 99, a two-part, heat-curable epoxy formulation is mixed in a centrifuge cup. If the ferrite elements have some porosity, they can be sealed by being centrifuged for up to 30 minutes to cause all bubbles induced by mixing to rise out of the viscous liquid, and to cause the liquid to penetrate and seal any porosity in the ferrite. Most preferably, a grade of ferrite is used which has very low porosity which does not require sealing in this fashion. The individual u-shaped ferrite segments are then placed in the metal ring, except for a gap surrounding the retaining bridge 43, as shown in FIGS. 12 and 14.) Any excess epoxy is wiped out of the unshaped groove. The upper surfaces of the parts can be precisely aligned with each other by holding them in position with magnets placed around the u-shaped trough in the mold. The epoxy is then cured, either at room temperature or in an oven.

The entire communication element 91, including the retaining bridge 43 and the wire 41, may be preassembled before the communication element 91 is inserted in the drill pipe, which can optionally be done in the field. The steel ring 45 has the advantage that it provides a durable frame upon which to house the relatively fragile MCEI. The communication element 91 may be retained in the recess 32 of FIG. 2 by means of a polymeric bonding material, preferably epoxy, polyurethane, polytetrafluoroethylene, or perfluoroalkoxy, most preferably epoxy. Most preferably, the communication element 91 is retained in recess 32 by means of a press fit.

As seen in FIGS. 11 and 11A, the communication element 91 preferably comprises a steel ring 45, an MCEI element, and a conductive coil 87. Lying within the trough of the MCEI element 89 is the electrically conductive coil 87. This coil is preferably made from at least one loop of an insulated wire, most preferably only a single loop. The wire is preferably made of copper, most preferably of silver-plated copper-clad steel, and is and insulated with varnish, enamel, or a polymer. Most preferably, the wire is insulated with a tough, flexible polymer such as high density polyethylene or polymerized tetrafluoroethane (PTFE). The diameter of the wire, with insulation, is preferably selected so as to be slightly less than the width of the U-shaped trough in the MCEI element. As will be discussed below, the specific properties of the wire and the number of loops is important in providing proper impedance for the coil 87.

As shown in FIGS. 11 and 14, the communication element 91 has a first and second contact for connecting to the coaxial cable 51. The first contact is preferably one end of the coil 87. The first contact is preferably retained in the communication element by a retention bridge 43. The retention bridge 43 is preferably inserted in a hole in the steel ring 45, holding the first contact in place and preventing the first contact from coming into electrical contact with the second contact. The retention bridge 43 is made from an electrically insulating material, preferably PTFE, more preferably PEEK®. PEEK® is a trademark for a linear aromatic, semi-crystalline, polyetheretherketone thermoplastic polymer manufactured by Victrex PLC. A typical supplier for such material is Zeus Products, Orangeburg, S.C. The second contact of the communication element 91 is in electrical contact with the steel ring 45, preferably by means of a welded connection 85.

For a given application, the transformer diameter is fixed by the diameter of the pipe. The impedance of the transformer, and its desired operating frequency, can be adjusted by two factors: the number of turns in the conductor and the ratio of length to area of the magnetic path, which curls around the conductors. Increasing the number of turns decreases the operating frequency and increases the impedance. Lengthening the magnetic path, or making it narrower, also decreases the operating frequency and increases the impedance. This is accomplished by increasing the depth of the U-shaped trough or by decreasing the thickness of the side-walls. Adjusting the number of turns gives a large increment, while adjusting the dimensions of the trough enables small increments. Accordingly, the invention allows the impedance of the transformer portion of the transmission line to be precisely matched to that of the conductor portion, which is typically in the range of 30 to 120 ohms. Although an insulated copper wire is preferred, other electrically conductive materials, such as silver or copper-coated steel, can be used to form the coil 87.

As can be seen in FIG. 11, in a preferred embodiment the coil 87 is embedded within a material which fills the space within the trough of the MCEI element 89. Naturally, this material should be electrically insulating. It is also preferable that this material is resilient so as to add further toughness to the MCEI element. The preferred material to use for this purpose is a two-part epoxy formulation, preferably one filled with a powdered material such as fumed silica or fine aluminum oxide to provide abrasion resistance. The applicants have used standard commercial grade epoxy combined with a ceramic filler material, such as aluminum oxide, in proportions of about 50/50 percent. Other proportions may be desirable, but the filler material should not be less than 3 percent nor greater than 90 percent in order to achieve suitable abrasion resistance as well as adequate adhesiveness. Alternatively, other materials, such as room-temperature curable urethanes, are used. It is important that the material be able to withstand the extreme conditions found downhole. Consequently, it is important to treat the material in such a way as to ensure the absence of voids or air pockets.

As can be seen in FIG. 3, the box end 11 also includes a recess 34 similar to the recess 32 in the pin end, except that the recess 34 is formed in the internal, secondary shoulder 36 of the box end. A communication element 92, similar in all respects to the communication element 90, is located within the recess 34.

As can be seen in FIG. 4, when the pin and box end are joined, the communication element 90 of the pin end and the communication element 92 of the box end are brought to at least close proximity. Preferably, the elements 90 and 92 are within about 0.5 mm of each other, more preferably within about 0.25 mm of each other. Most preferably, the elements 27 and 29 are in contact with each other.

Because the faces 35 and 36 of the pin and box end may need to be machined in the field after extended use, it may preferred to design the troughs in the pin and box end with a shape and size so as to allow the first and second conductive coils to lie in the bottom of the respective troughs and still be separated a distance from the top of the respective first and second sides. As a result, the faces 35 and 36 can be machined without damaging the coils lying at the bottom of the troughs. In this embodiment, this distance is preferably at least about 0.01 inches, more preferably, this distance is at least about 0.06 inches.

Turning to FIGS. 2 and 3, the passages 23 and 25 are holes, preferably drilled from one point in the bottom of the recess 32 and 34, respectively, through the enlarged wall of the pin end and box end, respectively, so that the holes open into the central bore of the pipe section 15. The diameter of the hole will be determined by the thickness available in the particular joint. For reasons of structural integrity it is preferably less than about one half of the wall thickness. Preferably, these holes have a diameter of about between 3 and 7 mm. As can be seen from FIGS. 2, 3, and 8, the diameter of the passages 23 and 25 preferably increases slightly towards the pin recess 32 and the box recess 34. These larger diameter sections towards the pin recess 32 and the box recess 34 are called the pin connector channel 31 and the box connector channel 33.

These two holes can be drilled by conventional means. Preferably, they are drilled by a technique known as gun drilling. Preferably, the recesses can be machined and the holes can be drilled in the field, so as to allow for retrofitting of existing drill pipe sections with the data transmission system of the present invention in the field.

A conductive tube 71 is placed within the passages 23 and 25. Preferably, the conductive tube 71 runs almost the entire length of the drill pipe, beginning in the pin end connector channel 31, continuing through the pin end passage 23, passing through the hole 93 to enter the interior of the body of the pipe section, entering hole 95, continuing through the box end passage 25, and ending near the box end connector channel 33. The conductive tube 71 is preferably held in tension after it is inserted in the drill pipe 15 and remains in tension during downhole use. This prevents the conductive tube 71 from moving relative to the passages 23 and 25 during downhole use. The conductive tube is preferably made of metal, more preferably a strong metal, most preferably steel. By "strong metal" it is meant that the metal is relatively resistant to deformation in its normal use state. The metal is preferably stainless steel, most preferably 316 or 316L stainless steel. A preferred supplier of stainless steel is Plymouth Tube, Salisbury, Md.

The elements of a preferred embodiment of the invention, from the communication element to the coaxial cable, are shown in FIGS. 6 through 10. FIGS. 7 through 10 are enlarged cross sectional views of FIG. 6 from right to left, with FIG. 7 showing an enlarged view of the right end of FIG. 6, FIGS. 8 and 9 showing enlarged views of the center, and FIG. 10 showing an enlarged view of the left side of FIG. 6. FIG. 15 is a perspective view of the conductive tube and connection elements and FIG. 17 is an enlarged perspective view of the conductive tube retainer elements.

In a preferred embodiment of the invention, the conductive tube is held in place in each end by means of an expansion plug or mandrel 61 and a retaining plug or barbed expansion mandrel 63, as shown in FIGS. 6 and 8. The expansion plug 61 preferably increases in diameter from front 62 to back 64, such that the diameter of the back 64 is larger than the initial inner diameter 104 of the conductive tube 71 and the front 62 is smaller than the initial conductive tube inner diameter 104 as shown best in FIGS. 15 and 17. The expansion plug or mandrel 61 has a center opening 101 through which the wire 41 passes and is preferably made of metal, more preferably tool steel, most preferably Viscount 44 steel. The center opening 101 as shown in FIG. 17 through which the wire 41 passes could also be electrically insulated. The expansion plug or mandrel can also be made of steel, titanium, chrome, nickel, aluminum, iron, copper, tin, and lead. Additionally it can be made of stainless steels and 4100 series steels. Most preferably, the expansion mandrel hardness is at least 30 on a Rockwell C hardness scale. In another embodiment, the expansion mandrel can be made of a ceramic such as cemented tungsten carbide, alumina, silicon carbide, silicone nitride, and polycrystalline diamond. Thus, as the expansion plug or mandrel 61 is inserted in the conductive tube 71, the outer diameter of the conductive tube 71 is increased creating a first outer diameter 102 and a second outer diameter 103 as shown clearly in FIGS. 15 and 17.

The expansion plug or mandrel 61 is inserted up to a distance relatively near the transition point 97, where the diameter of the passage 31 or 33 undergoes a change in diameter. The change in diameter results in the passageway forming complimentary recesses 105 and 106 with the first outer diameter 102 and second outer diameter 103 of the conductive tube. The complimentary recesses can be formed by means of gun drilled hole with a counter bore at each end of the gun drilled hole. In another embodiment, the passageway can be the result of two or more complimentary recesses. These multiple recesses can be formed by multiple counter bores at each end of the gun drilled hole. The result of this insertion of the expansion plug or mandrel 61 is that the diameter of the conductive tube 71 is larger on each end, so that the conductive tube 71 is held in place in the passages 31 and 33.

In a preferred embodiment, the expansion plug or mandrel 61 is held in place by a retaining plug or barbed expansion mandrel 63, as shown in FIG. 8. The retaining plug or barbed expansion mandrel 63 is placed in the conductive tube 71 after the expansion plug or mandrel 61 and has a center opening through which the wire 41 passes. The center opening through which the wire 41 passes could also be electrically insulated. The retaining plug or barbed expansion mandrel 63 is made of metal, more preferably tool steel, most preferably Viscount 44 steel. The retaining plug or barbed expansion mandrel can also be made of steel, titanium, chrome, nickel, aluminum, iron, copper, tin, and lead. Additionally it can be made of stainless steels and 4100 series steels. Most preferably, the barbed expansion mandrel hardness is at least 30 on a Rockwell C hardness scale. In another embodiment, the barbed expansion mandrel can be made of a ceramic such as cemented tungsten carbide, alumina, silicon carbide, silicone nitride, and polycrystalline diamond. In a preferred embodiment, the retaining plug or barbed expansion mandrel 63 has ridges along its outer diameter to dig into the inner diameter of the conductive tube 71 and hold the expansion plug or mandrel 61 in place. The conductive tube outer diameter 102 can also be press-fit into the passageway 105. In a preferred embodiment, the conductive tube is in tension within the passageway of the pipe. The preferred amount of tension is between 300 and 1200 pounds-force.

After exiting the holes 93 and 95, the conductive tube 71 passes through the interior of the body of the pipe section. In an alternative embodiment, the conductive tube may be insulated from the pipe in order to prevent possible galvanic corrosion. At present, the preferred material with which to insulate the conductive tube 71 is PEEK®.

As shown in FIGS. 2 and 3, the coaxial cable 51 runs inside the conductive tube 71. As shown in FIGS. 6 and 10, the coaxial cable 51 has a conductive core 79 surrounded by a dielectric sheath 81. In one embodiment of the invention, the coaxial cable 71 also has a conductive sheath surrounding the dielectric sheath 81 and in electrical contact with the conductive tube 71. The coaxial dielectric sheath 71 prevents electrical contact between the coaxial core 79 and the conductive tube 71. As shown in FIG. 10, in a preferred embodiment, an inner layer of the dielectric sheath 81 is removed from around the conductive core 79 at each end, while leaving the outer layer of the dielectric sheath 81 in place next to the conductive tube 71. This allows insertion of the connector 53 around the conductive core 79 and within the dielectric sheath 81.

At present, the coaxial cable preferably has a characteristic impedance in the range of about 30 to about 120 ohms, most preferably with a characteristic impedance in the range of 50 to 75 ohms. Because the attenuation of coaxial cable decreases with increasing diameter, the largest diameter compatible with installation in pipe chosen for a particular application should be used. Most preferably the cable has a diameter of about 0.25" or larger. Preferably the shield should provide close to 100% coverage, and the core insulation should be made of a fully-dense polymer having low dielectric loss, most preferably from the family of polytetrafluoroethylene (PTFE) resins, Dupont's Teflon® being one example. A foamed polymer may also be used as the core insulation.

It is preferable to select the electrical properties of the conductor so as to match the impedance of the coils to which it is attached. Preferably, the ratio of the impedance of the electrical conductor to the impedance of the first and second electrically conductive coils is between about 1:2 and 2:1. Most preferably, it is close to 1:1.

The preferred data transmission system provides a relatively broad bandwidth. While not wishing to be bound by any particular theory, it is currently believed that this is accomplished by the low number of turns of the conductor and the low reluctance of the magnetic path, thus producing a surprisingly low mutual inductance for such a large diameter coil. For a two-turn coil with a 4.75-inch diameter, the mutual inductance of the assembled toroid is about 1 micro Henry. With a 50 ohm resistive load, peak signal transmission is at about 4 MHz, and at power transmission extends from about 1 MHz to about 12 MHz. The inductive reactance is about 65 ohms, and the attenuation is only about 0.35 dB per joint, equivalent to power transmission of about 92 percent. In some respect, the communication element is thought to perform as a transmission-line transformer, wherein the coupling between the adjacent coils comprises distributed elements of both capacitance and inductance. Thus, the term "inductive coil" is intended to include both coils that transfer signals via induction as well as those coils that act as a transmission-line transformer. As adjacent segments are assembled, a serial filter is created, which has the effect of reducing the bandwidth. If each individual transformer had a narrow bandwidth, the band-pass of the filter would change as additional segments are added, which would require that each individual element be separately tuned according to its position in the system. Nevertheless, a surprising feature of the invention is that identical segments can be assembled in any arbitrary number of joints while still enabling efficient signal coupling. The 30-joint test described below gave a total attenuation of 37.5 dB (0.018% power transmission), of which 70% was in the coaxial cable itself, which was chosen to have a shield diameter of 0.047 inches. Maximum power transmission was at 4.2 MHz and the bandwidth, at half power, of 2 MHz. Thus a six volt, 90 milliwatt signal resulted in a detected signal, after 30 joints, of 80 mV.

As shown in FIGS. 6, 9, and 10, in both the pin connector channel 31 and the box connector channel 33 is a connector 53. The connector 53 permits the coaxial cable 51 to transmit an electrical signal to the communication element 91. The connector 53 has a conductive sleeve 75 which fits around the conductive core 79. The connector 53 has an insulative coating 77 to prevent electrical contact between the conductive sleeve 75 and the conductive tube 71. Preferably, the insulative coating is TEFLON®. During assembly, the connector 53 is pushed over the conductive core 79, making electrical contact with it. Preferably the connector 53 makes spring contact with the conductive core 79.

In a preferred embodiment, connector 53 fits around a wire 41, which is in electrical contact with the communication element 91. Most preferably the wire 41 is one end of the conductive coil 87. The wire 41 is preferably made of copper or silver-plated, copper-clad steel. The wire 41 has an insulative coating 59, which is made of varnish, enamel, or a polymer. Most preferably, the insulative coating 59 is a tough, flexible polymer such as high density polyethylene or polymerized tetrafluoroethane (PTFE). Preferably, the insulative coating 59 of the wire 41 is removed on the end of the wire 41 closest to the connector 53, in order to facilitate electrical contact between the conductive sleeve 75 and the wire 41. In a more preferred embodiment, the connector 53 is crimped around the wire 41 in order to ensure good electrical contact between the conductive sleeve 75 and the wire 41.

In one embodiment of the invention, as shown in FIG. 9, a centering insulator 73 is used to help position the connector 53. The centering insulator 73 is funnel-shaped at each end and is made of a dielectric material, preferably PTFE, most preferably PEEK®. The centering insulator 73 is hollow in the center, allowing it to slide around the connector 53 and guide the connector 53 towards the core 79.

In a preferred embodiment of the invention, a water-tight seal 55, as shown in FIG. 6, is present in both the pin end connector channel 31 and the box end connector channel 33 to protect the connections from the high temperature and high pressure downhole conditions. As shown in FIG. 8, in a preferred embodiment, a spacer 65 is placed between the retaining plug or barbed expansion mandrel 63 and the water-tight seal. Most preferably, the spacer 65 is made of fiberglass. In the most preferred embodiment, the seal 55 is located proximate to the retaining plug or barbed expansion mandrel, as shown in FIG. 8, and forms a seal between the inner surface of the conductive tube 71 and the outer surface of the wire 41. In one embodiment, the seal comprises at least one O-ring 67 and at least one backup 69. Most preferably, there are at least three O-rings 67 and three backups 69. The O-rings 67 are preferably made of rubber, more preferably fluoroelastomer, most preferably a fluoroelastomer marketed under the trademark AFLAS® or VITON®. The backups 69 are preferably made of PEEKS and have a v-shaped indentation around one end. As an O-ring 67 is compressed, it moves into the indentation in the backup 69 and causes the outer diameter of the backup 69 to press against the conductive tube 71 and the inner diameter to press against the wire 41, thus helping to maintain the water-tight seal.

In an alternative embodiment, a water-tight seal is present between the connector 53 and the inner surface of the conductive tube 71. In this embodiment, the seal is provided by at least one circumferential groove on the outside of the connector and at least one gasket fitting therein. Alternate embodiments may protect the connection with a water tight seal in other locations, such as between the coaxial core 79 and the conductive tube 71, between the connector 53 and the conductive tube 71, and between the wire 41 and the connecting channels 31 and 33.

Many types of data sources are important to management of a drilling operation. These include parameters such as hole temperature and pressure, salinity and pH of the drilling mud, magnetic declination and horizontal declination of the bottom-hole assembly, seismic look-ahead information about the surrounding formation, electrical resistivity of the formation, pore pressure of the formation, gamma ray characterization of the formation, and so forth. The high data rate provided by the present invention provides the opportunity for better use of this type of data and for the development of gathering and use of other types of data not presently available.

Preferably, the system will transmit data at a rate of at least 100 bits/second, more preferably, at least 20,000 bits/second, and most preferably, at least about 2,000,000 bits/second.

An advantage of the present invention is that it requires relatively low power and has a relatively high preservation of signal. Thus, the system preferably transmits data through at least 30 components powered only by the varying current supplied to one of the first conductive coils in one of the components. More preferably, the system transmits data through at least 50 components powered only by the varying current supplied to one of the first conductive coils in one of the components. Preferably, the varying current supplied to the first conductive coil in the one component is driving a varying potential having a peak to peak value of between about 10 mV and about 20 V. Preferably, the power loss between two connected components is less than about 5 percent.

It is anticipated that the transmission line of the invention will typically transmit the information signal a distance of 1,000 to 2,000 feet before the signal is attenuated to the point where it will require amplification. This distance can be increased by sending a stronger signal, with attendant increased power consumption. However, many wells are drilled to depths of up to 20,000 to 30,000 feet, which would necessitate use of repeaters to refurbish the signal. Preferably, the amplifying units are provided in no more than 10 percent of the components in the string of downhole components, more preferably, no more than 3 percent.

Such repeaters can be simple "dumb" repeaters that only increase the amplitude of the signal without any other modification. A simple amplifier, however, will also amplify any noise in the signal. Although the down-hole environment is thought to be relatively free of electrical noise in the RF frequency range preferred by the invention, a digital repeater will provide a fresh signal without amplifying background noise. Most preferably, a "smart" repeater that detects any errors in the data stream and restores the signal, error free, while eliminating baseline noise, is preferred. Any of a number of known digital error correction schemes can be employed in a down-hole network incorporating a "smart" repeater.

Most preferably, the repeater not only serves to regenerate the data stream, but also serves as a data source itself. Prior to the present invention, information was available during drilling only from the bottom-hole assembly, as mud pulse data rates did not allow any intermediate nodes. With the present invention, information is available from any node along the drill string, thereby enabling distributed access to information from top to bottom. For instance, instead of relying on a single bottom hole pressure measurement, a pressure profile can now be generated along the entire drill string. This could be vital in underbalanced drilling, where to speed up drilling the pressure provided by the mud is less than that of the pore pressure in the surrounding formation. Any sudden pressure pulse or "kick" could be much more rapidly anticipated. Other types of data sources for down-hole applications are inclinometers, thermocouples, gamma ray detectors, acoustic wave detectors, neutron sensors, pressure transducers, potentiometers, strain gages, seismic sources, and seismic receivers.

It is therefore intended that the foregoing detailed description be regarded as illustrative rather than limiting, and that it be understood that it is the following claims, including all equivalents, that are intended to define the spirit and scope of this invention.

What is claimed is:

1. An electrical transmission line diametrical retainer comprising an internal diametrical expansion mandrel with a central passage, the expansion mandrel having a front and back end, the back end having an outer diameter that is greater than an outer diameter of the front end wherein the back end has external circumferential grooved barbs or a barbed expansion mandrel.

2. The retainer of claim 1 wherein the retainer comprises a central passage that is electrically insulated.

3. The retainer of claim 1 wherein the expansion mandrel is made of a metal.

4. The retainer of claim 3 wherein the metal is selected from the group consisting of steel, titanium, chrome, nickel, aluminum, iron, copper, tin, and lead.

5. The retainer of claim 4 wherein the retainer's hardness is at least 30 on a Rockwell C hardness scale.

6. The retainer of claim 4 wherein the steel is selected from the group consisting of viscount 44, stainless steel, tool steel, and 4100 series steels.

7. An electrical transmission line diametrical retainer comprising an internal diametrical expansion mandrel with a central passage, the expansion mandrel having a front and back end, the back end having an outer diameter that is greater than an outer diameter of the front end wherein the retainer comprises a central passage that is electrically insulated.

8. The retainer of claim 7 wherein the expansion mandrel is made of a metal.

9. The retainer of claim 8 wherein the metal is selected from the group consisting of steel, titanium, chrome, nickel, aluminum, iron, copper, tin, and lead.

10. The retainer of claim 9 wherein the retainer's hardness is at least 30 on a Rockwell C hardness scale.

11. The retainer of claim 9 wherein the steel is selected from the group consisting of viscount 44, stainless steel, tool steel, and 4100 series steels.

12. An electrical transmission line diametrical retainer comprising: an internal diametrical expansion mandrel with a central passage, the expansion mandrel having a front and back end, the back end having an outer diameter that is greater than an outer diameter of the front end wherein the expansion mandrel is made of a ceramic.

13. The retainer of claim 12 wherein the ceramic is selected from the group consisting of cemented tungsten carbide, alumina, silicon carbide, silicone nitride, and polycrystalline diamond.

14. A system for mechanically retaining an electrical transmission line in a passageway comprising:
   a coaxial cable, the coaxial cable comprising a conductive tube and a conductive core within it, the conductive tube having a first and a second outer diameter, the second outer diameter being larger than the first outer diameter
   an internal diametrical expansion mandrel or retainer with a central passage, the expansion mandrel having a front and a back end, the back end having an outer diameter that is greater than an outer diameter of the front end;
   the front end outer diameter is less than an inner diameter of the conductive tube, the back end outer diameter is greater than the inner diameter of the conductive tube;
   the expansion mandrel is disposed within the conductive tube so as to maintain the increased outside diameter of the conductive tube;
   the passageway in which the coaxial cable is placed comprises recesses complimentary with the first and second conductive tube outer diameters.

15. The system of claim 14 wherein the retainer has external circumferential grooved barbs on the back end.

16. The system of claim 14 wherein two or more retainers are placed within the conductive tube.

17. The system of claim 14 wherein the passageway is a gun-drilled hole with counter bored ends.

18. The system of claim 14 wherein the passageway comprises two or more recesses.

19. The system of claim 14 wherein the outer diameter of the conductive tube is press fit into the passageway.

20. A system for mechanically retaining an electrical transmission line for use in a rotary drill string, the drill string comprising individual drill pipe sections, each pipe section containing the electrical transmission line; the system comprising:
   a drill pipe with a uniform internal diameter having a box end tool joint and a pin end tool joint;
   a passageway in each box end and pin end tool joint which is connected to the internal pipe diameter and runs along the longitudinal axis of the pipe;
   a coaxial cable, the coaxial cable comprising a conductive tube and a conductive core within it, the conductive tube having a first and a second outer diameter, the second outer diameter being larger than the first outer diameter;
   a first and second expansion mandrel with the central passage, each expansion mandrel is disposed within the conductive tube,
   a first and second barbed expansion mandrel with a central passage, each barbed expansion mandrel having external circumferential grooves, the barbed expansion mandrel is disposed within the conductive tube and placed adjacent each expansion mandrel, the passageway in which the coaxial cable is placed comprises recesses complimentary with the first and second conductive tube outer diameters.

21. The system of claim 20 wherein the conductive tube is press-fit into the passageway.

22. The system of claim 20 wherein the tube is in tension.

23. The system of claim 22 wherein the tube is tensioned between 300 and 1200 pounds-force.

* * * * *